US007155259B2

(12) United States Patent
Bauchot et al.

(10) Patent No.: US 7,155,259 B2
(45) Date of Patent: Dec. 26, 2006

(54) SYSTEM FOR TRANSMITTING TO A WIRELESS SERVICE PROVIDER PHYSICAL INFORMATION RELATED TO A MOVING VEHICLE DURING A WIRELESS COMMUNICATION

(75) Inventors: Frederic Bauchot, Saint Jeannet (FR); Gerard Marmigere, Drap (FR); Pierre Secondo, Tourrettes sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 10/978,985

(22) Filed: Nov. 1, 2004

(65) Prior Publication Data

US 2005/0119030 A1 Jun. 2, 2005

(30) Foreign Application Priority Data

Nov. 27, 2003 (EP) ................................ 03368103

(51) Int. Cl.
*H04B 1/38* (2006.01)
*H04M 1/00* (2006.01)

(52) U.S. Cl. .................... 455/564; 455/569.2; 340/439

(58) Field of Classification Search .................... None
See application file for complete search history.

(56) References Cited

U.S. PATENT DOCUMENTS

| | | | | |
|---|---|---|---|---|
| 6,154,663 | A * | 11/2000 | Itamochi | 455/569.2 |
| 6,262,657 | B1 * | 7/2001 | Okuda et al. | 340/439 |
| 6,295,449 | B1 * | 9/2001 | Westerlage et al. | 455/422.1 |
| 6,922,571 | B1 * | 7/2005 | Kinoshita | 455/567 |
| 2002/0191765 | A1 * | 12/2002 | Labaton | 379/201.01 |
| 2004/0024522 | A1 * | 2/2004 | Walker et al. | 701/210 |
| 2004/0162089 | A1 * | 8/2004 | Fan et al. | 455/456.3 |
| 2005/0200479 | A1 * | 9/2005 | Campbell | 340/539.18 |

* cited by examiner

*Primary Examiner*—Rafael Perez-Gutierrez
*Assistant Examiner*—Christopher M. Brandt
(74) *Attorney, Agent, or Firm*—Norman L. Gundel; Hoffman, Warnick & D'Alessandro LLC

(57) ABSTRACT

The present invention is directed to a method and system for detecting a wireless telephone communication in a vehicle, and once detected, when the vehicle exceeds a predefined speed limit, for generating and sending Dual-Tone Multi Frequency (DTMF) encoded information over the voice channel. The encoded information comprises the values of various physical parameters related to the moving vehicle. For instance, these parameters can include the current time at which the telephone communication started, and optionally, the position of the vehicle. In a particular embodiment, the values of the various parameters are sent at regular time intervals until the communication terminates.

16 Claims, 3 Drawing Sheets

SYSTEM FOR TRANSMITTING TO A WIRELESS SERVICE PROVIDER PHYSICAL INFORMATION RELATED TO A MOVING VEHICLE DURING A WIRELESS COMMUNICATION

TECHNICAL FIELD

The present invention relates to wireless communications, and more particularly to a system for transmitting physical information related to a moving vehicle to a telecommunication service provider during a wireless communication.

BACKGROUND ART

Wireless communication is very common for private and business uses, and many businesses depend on this technology. In this context, a person driving a car often receives a call on his/her mobile phone or needs to call someone from his/her mobile phone. However, it is very dangerous (and even forbidden in some countries) to call or to answer phone calls while driving a car and it is recommended for drivers to switch off their mobile phones. Countries have established laws specifying the way and conditions mobile phones can or cannot be used in vehicles. However, in case of an accident, it is extremely difficult or even impossible for the police or an insurance company to legally determine whether or not a mobile phone was used in an involved vehicle at the time the accident occurred. It may also be very difficult for the driver to legally prove whether or not he/she was using his/her mobile phone at the time of the accident.

To solve this problem, it would be desirable to record and transmit in an accurate and auditable way, relevant physical information relative to the vehicle such as speed, time, and geographical position, when the driver of a vehicle places or receives a call with his/her wireless phone.

The problem to solve is to transmit to a safe and trusted organisation such as a telecommunication service provider, the values of one or more physical parameters related to a vehicle each time a communication is established with a wireless phone within the vehicle.

The system for transmitting the values of these parameters to a telecommunication service provider must be able to certify the correctness and integrity of these values at the time a wireless communication took place. The system must be reliable and trusted in any circumstances.

Furthermore, the system must be "universal," and must not depend on the telephone network, the telephone operator, or the country in which the system is operating.

To limit the costs, the system must be easy to implement without impacting the architecture and design of existing communication apparatus.

The aforementioned problems of recording one or more vehicle parameters have already been addressed in the literature and various implementations exist. For instance, trucks are equipped with various recording systems. However, data recorded by these systems cannot be correlated with the telephone calls received in the vehicle or sent from the vehicle. Furthermore, since these systems are installed in the trucks, it is impossible to guarantee a full inviolability of data. Generally, only the speed is recorded with the time.

In conclusion, none of the aforementioned prior art techniques addresses the problem of correlating one or more physical parameters related to a moving vehicle with the occurrence of a wireless communication with a mobile phone.

SUMMARY OF THE INVENTION

An object of the present invention is to transmit relevant physical parameters of a vehicle to a telecommunication service provider when an incoming or outgoing mobile telephone communication from a moving vehicle is detected.

A further object of the present invention is to transmit to the telecommunication service provider the vehicle speed, the current time, and optionally the vehicle position (location) at the time a communication is detected and at regular time intervals during the communication.

Another object of the present invention is to provide a simple and low cost solution for the transmission of these physical parameters which does not depend on the wireless network and wireless apparatus.

The present invention is directed to a method and system for detecting a wireless telephone communication in a vehicle, and once detected, for generating and sending Dual-Tone Multi Frequency (DTMF) encoded information over a voice channel when the vehicle exceeds a particular speed limit. The encoded information comprises the values of various physical parameters related to the moving vehicle. For instance, these parameters can include the current time at which the telephone communication started, and optionally, the position of the vehicle. In a particular embodiment, the values of the various parameters are sent at regular time intervals until the communication terminates.

More particularly, the present invention relates to a method and system for transmitting over a wireless communication, information relative to a moving vehicle. The method comprises the steps of: detecting a wireless communication with a mobile communication system in the vehicle; comparing a measured vehicle speed with a threshold; and when a wireless communication with the mobile communication system in the vehicle is detected and when the measured vehicle speed exceeds the threshold: encoding information related to the vehicle; translating the encoded information into Dual Tone Multi Frequency (DTMF) characters; and transmitting the DTMF characters over the wireless communication.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF THE INVENTION

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
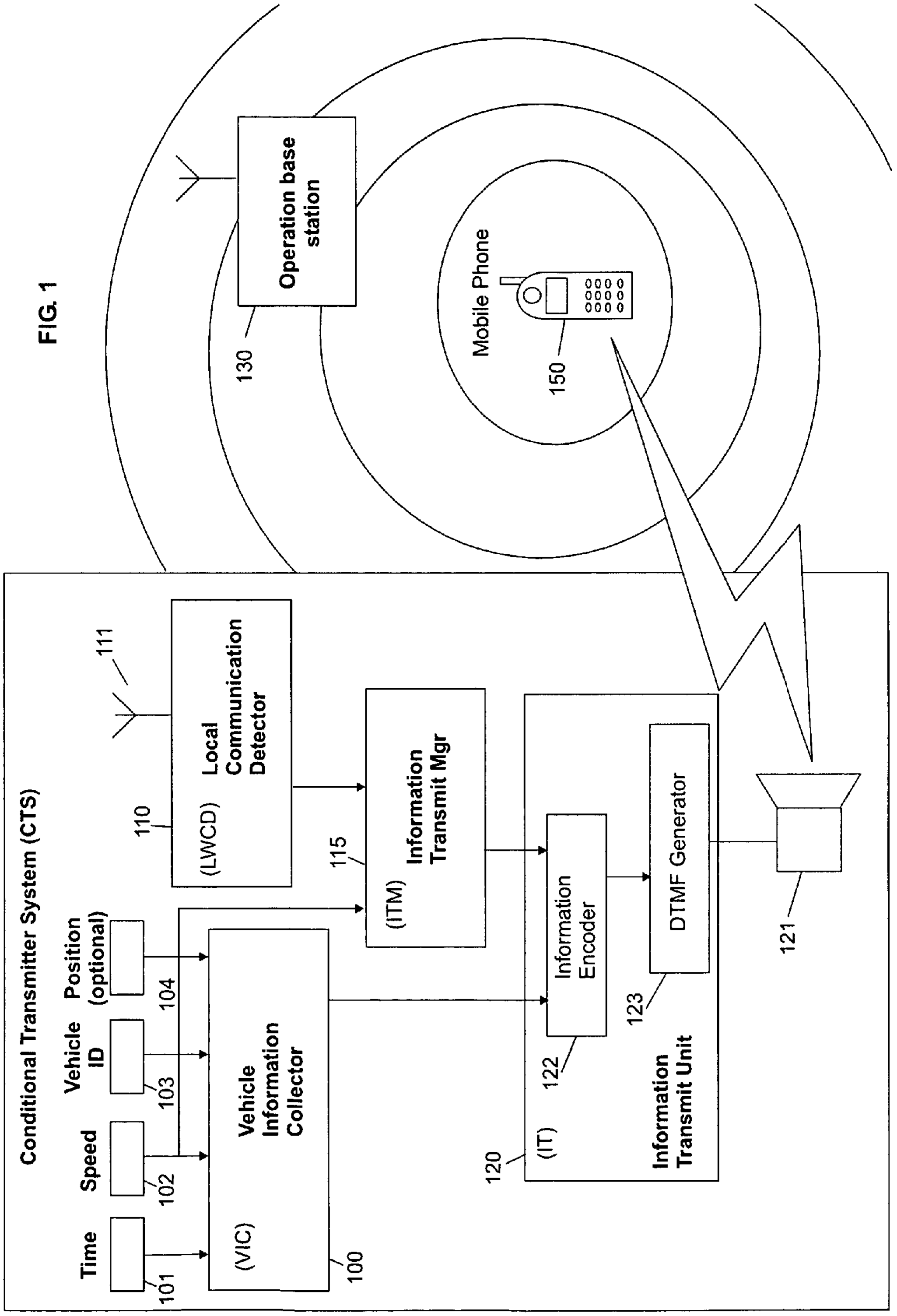
FIG. 1 is a schematic view of the different components involved in the present invention.

FIG. 1 is a schematic view of the different component parts of the present invention. In a preferred embodiment, a system of transmitting DTMF encoded data in accordance with the present invention comprises a conditional transmitter system (CTS). The conditional transmitter system (CTS) comprises an information transmission unit (IT) 120 connected to both an information transmission manager unit (ITM) 115, and a vehicle information collector unit (VIC) 100.

The vehicle information collector unit (VIC) 100 is connected to different sources of information available within the vehicle, including a clock 101 indicating the current time, a speedometer 102 indicating the current speed of the vehicle, a vehicle ID 103 providing a universal and unique identification of the vehicle, and optionally, a GPS (Global Positioning System) device 104 for providing the current geographical position of the vehicle (x, y).

Cyclically (with a predefined frequency that can be adjusted), the vehicle information collector unit (VIC) 100 builds a message in which data provided by each information source is encoded and transmitted to the information transmission unit (IT) 120.

The information transmission manager unit (ITM) 115 is connected to the speedometer 102 and to a local wireless telephone communication detector unit (LWCD) 110. The information transmission manager unit (ITM) 115 is in charge of initiating the transmission of information when a communication is detected and when the vehicle speed exceeds a predefined threshold value.

The local wireless telephone communication detector unit (LWCD) 110 comprises a radio receiver with an antenna 111, tuned to detect the energy emitted by the mobile communication system 150 in the UHF (Ultra High Frequencies) band when a communication is established. It is possible to detect communications because in "standby," a cellular telephone emits a signal with very low energy in the range of few milliwatts, while during a communication, the emitted signal has an energy range comprised between a fraction of a watt up to two watts (for Global System for Mobile Communications (GSM) telephones). This means that between the standby state and the communication state, the emitted energy varies according to a ratio of several hundreds to several thousands. When a communication is detected, the local wireless communication detector unit (LWCD) 110 sends a signal "communication ON" to the information transmit manager unit (ITM) 115. The information transmission manager unit (ITM) 115 monitors the vehicle speed 102. When the vehicle speed exceeds a particular threshold and when a signal "communication ON" is received from the local wireless communication detector unit (LWCD) 110, a "transmission ON" signal is generated by the information transmission manager unit (ITM) 115 and sent to the information transmitter unit (IT) 120 by applying a predefined voltage on the line between the information transmission manager unit (ITM) 115 and the information transmitter unit (IT) 120. The "transmission ON" signal is maintained as long as the wireless communication is detected and the vehicle speed exceeds the particular threshold. When the communication is terminated with the indication "communication OFF" or when the vehicle speed is below the speed limit, a "transmission OFF" signal is generated.

The information transmission unit (IT) 120 includes an information encoder 122, which periodically processes the information received from the vehicle information collector unit (VIC) 100 as long as the "communication ON" signal is received from the local wireless telephone communication detector unit (LWCD) 110, and a DTMF tone generator 123 which transforms the received information in audible tones played by a loud speaker 121. These tones are picked up by a microphone of the mobile communication system 150 currently used in the vehicle and transmitted together with the conversation over the telephone channel. Telephone operator equipment 130 monitors the DTMF signals and records the retrieved information. The retrieved information will be used in case of audit.

Figure 2:
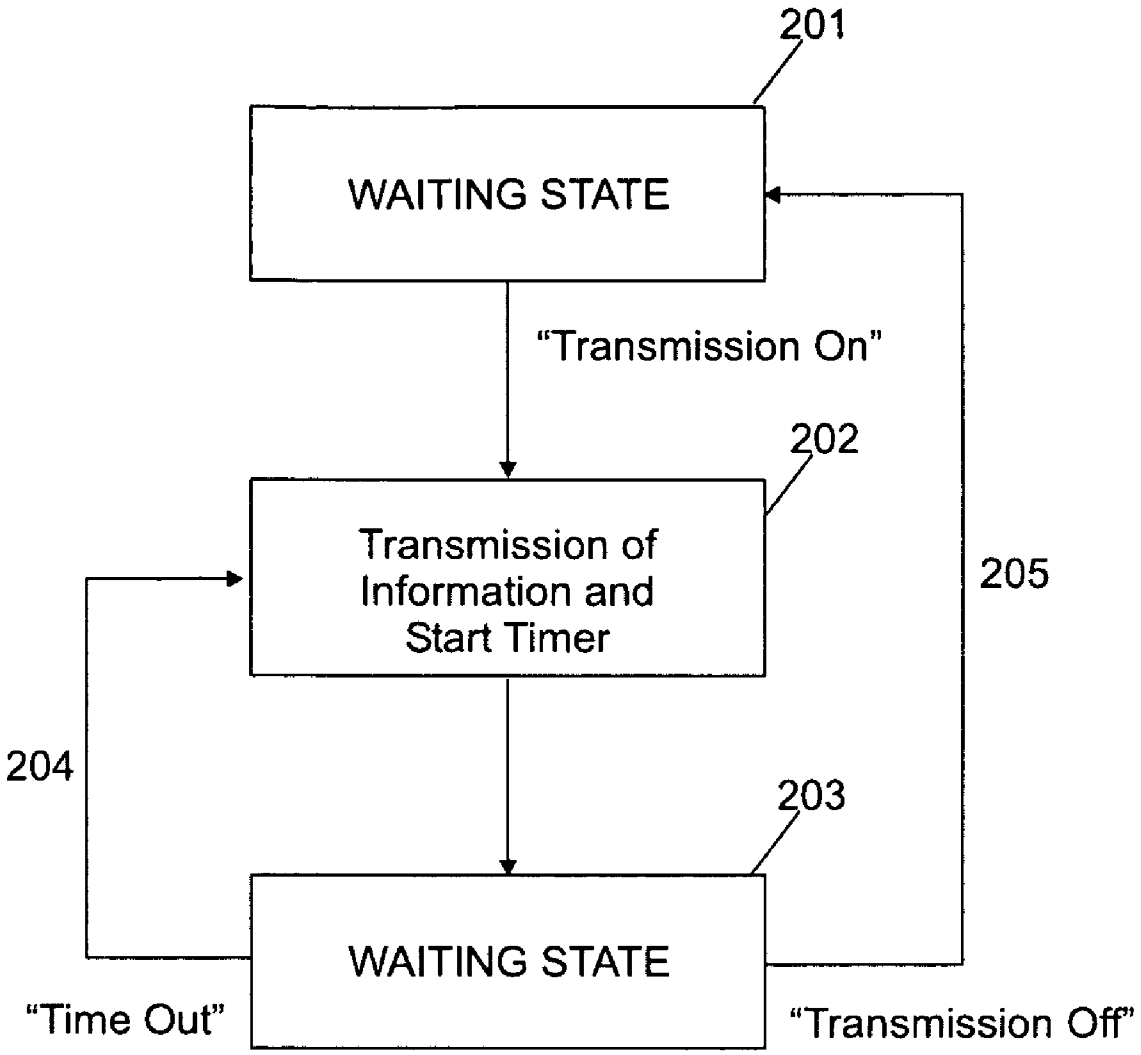
FIG. 2 is a flow chart illustrating a method of managing the transmission of the values of the physical parameters of the vehicle according to the present invention.
Figure 3:
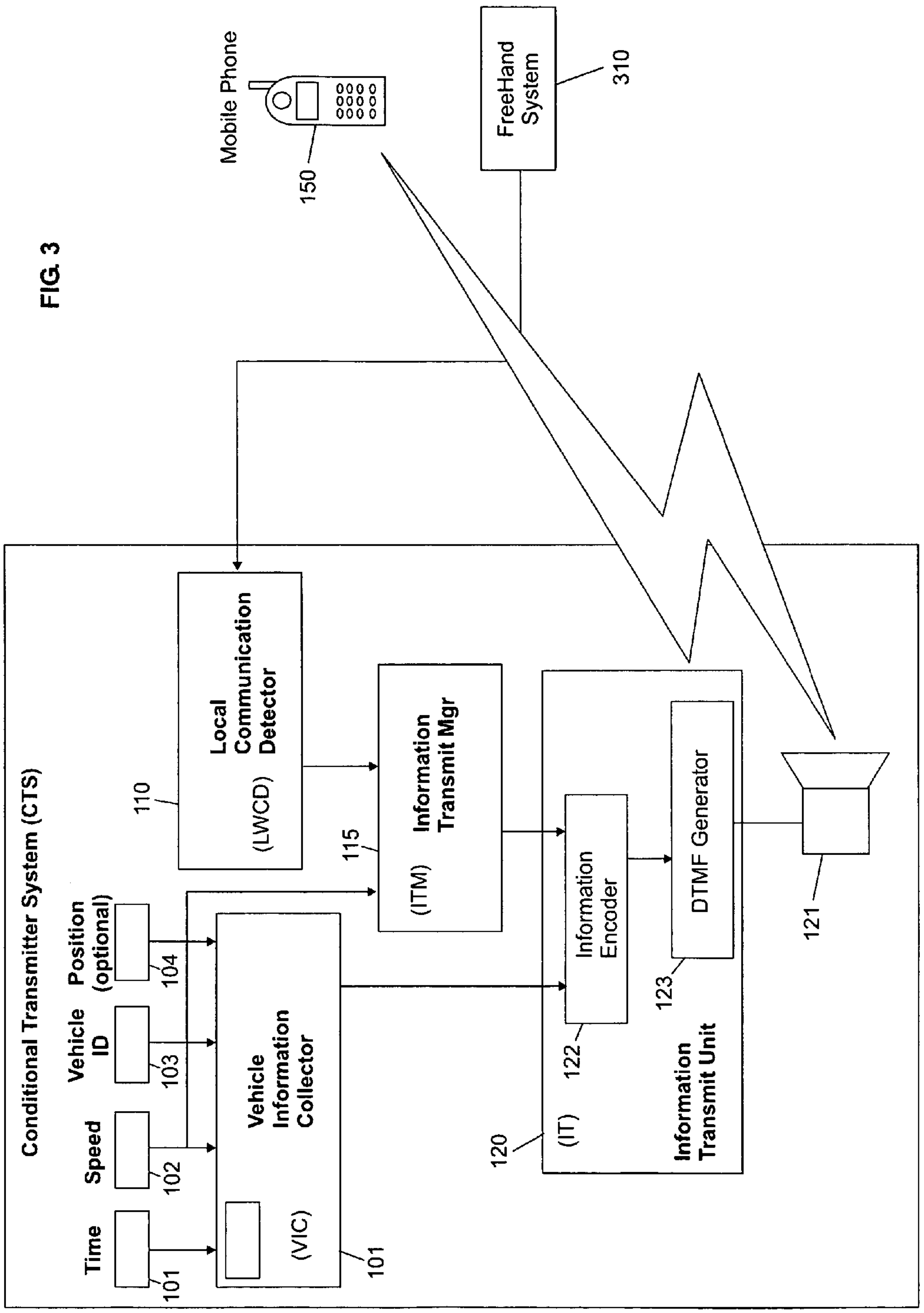
FIG. 3 is a schematic view of the different components involved in the present invention, when the mobile communication system comprises a free hand system.

The method of transmitting information using wireless communications in a moving vehicle is summarised in FIG. 2. The method used in the information transmission unit (IT) 120, comprises the following steps:

At step 201, the method after initialisation is in its default state (waiting state), and waits for the receipt of a "transmission ON" signal. The "transmission ON" signal is generated by the information transmission manager unit (ITM) 115 and is based on the "communication ON" signal generated by the local wireless telephone communication detector unit (LWCD) 110 and the measured vehicle speed 102.

At step 202, the "transmission ON" signal appears as the result of: the detection of a wireless call by the local wireless telephone communication detector unit (LWCD) 110, and the detection by the vehicle information collector unit (VIC) 100 of a vehicle speed exceeding a particular speed limit. The information transmission unit (IT) 120 starts to process the messages received from the vehicle information collector unit (VIC) 100. This process is first handled by the information encoder 122, which translates the information provided by the vehicle information collector unit (VIC) 100, such as time, vehicle speed, and optionally a geographical position of the vehicle, into DTMF characters (0, 1, 2, 3, 4, 5, 6, 7, 8, 9, *, #, A, B, C, and D). The DTMF characters are transmitted to the DTMF Generator 123 where they are transformed into DTMF tones for telephonic signalling. The DTMF tones are played by a loudspeaker 121. The DTMF tones are picked up by the mobile communication system (the cellular telephone system or mobile phone) 150 and are mixed with the current voice communication. Then, a timer is started to activate the next transmission of information.

At step 203, the information transmission unit (IT) 120 is in a waiting state. A time out 204 signal informs the information transmission unit (IT) 120 to continue the transmission of the messages received cyclically from the vehicle information collector unit (VIC) 100 as long as the "transmission ON" signal is maintained by the information transmission manager unit (ITM) 115. The receipt of a "transmission OFF" signal 205 is the result of the termination of the a wireless call or a vehicle speed lower than the predefined threshold. After receipt of a "transmission OFF" signal, the method returns to its default state 201 (waiting state).

In an alternate embodiment, the mobile communication system comprises a free hand system 310 connected to a mobile communication system 150 (e.g., mobile phone), and the conditional transmitting system (CTS) is used in the vehicle jointly with this free hand telephone system 310. In this particular embodiment, the local wireless communication detector unit (LWCD) 110, is connected to the free hand telephone system 310. The local wireless communication detector unit (LWCD) 110 monitors the "Audio OUT" signal output of the free hand system 310 and generates a "Communication ON" signal when a call is detected. The detection of a call is based on the variation of energy in output of the free hand telephone system.

What we claim is:

1. A method for transmitting over a wireless communication, information relative to a moving vehicle, the method comprising the steps of:
- detecting a wireless communication with a mobile communication system in the vehicle;
- comparing a measured vehicle speed with a threshold; and
- when a wireless communication with the mobile communication system in the vehicle is detected and when the measured vehicle speed exceeds the threshold:
  - encoding information related to the vehicle;
  - translating the encoded information into Dual Tone Multi Frequency (DTMF) characters;
  - generating DTMF tones from the DTMF characters;
  - playing the generated DTMF tones over a loudspeaker;
  - picking up the played DTMF tones with the mobile communication system; and
  - transmitting the played DTMF tones together with the wireless communication using the mobile communication system.

2. The method according to claim 1, wherein the steps of encoding information related to the vehicle, translating the encoded information into DTMF characters, generating DTMF tones from the DTMF characters. playing the generated DTMF tones over a loudspeaker, picking up the played DTMF tones with the mobile communication system, and transmitting the played DTMF tones together with the wireless communication are repeated as long as a wireless communication with the mobile communication system in the vehicle is detected and the measured vehicle speed exceeds the threshold.

3. The method according to claim 1, wherein the step of encoding information related to the vehicle, comprises the step of:
- encoding a current time, and the vehicle speed measured at the current time.

4. The method according to claim 1, wherein the step of encoding information related to the vehicle, comprises the step of:
- encoding an identification of the vehicle.

5. The method according to claim 1, wherein the step of encoding information related to the vehicle, comprises the steps of:
- determining a current position of the vehicle; and
- encoding the current position.

6. The method according to claim 1, wherein the DTMF tones corresponding to the DTMF characters are transmitted over the wireless communication to a telecommunication service provider, where the DTMF tones are filtered, and information transmitted in the DTMF tones is decoded and recorded.

7. The method according to claim 1, wherein the step of detecting a wireless communication with a mobile communication system in the vehicle comprises the further step of:
- detecting a variation of energy emitted by the mobile communication system.

8. The method according to claim 1, wherein the mobile communication system comprises a free hand system and a mobile phone, and wherein the step of detecting a wireless communication with a mobile communication system in the vehicle comprises the further step of:
- detecting a variation of energy in an output of the free hand system.

9. A system for transmitting over a wireless communication, information relative to a moving vehicle, comprising:
- a system for detecting a wireless communication with a mobile communication system in the vehicle;
- a system for comparing a measured vehicle speed with a threshold;
- a system for encoding information related to the vehicle, when a wireless communication with the mobile communication system in the vehicle is detected and when the measured vehicle speed exceeds the threshold;
- a system for translating the encoded information into Dual Tone Multi Frequency (DTMF) characters;
- a system for generating DTMF tones from the DTMF characters:
- a system for playing the generated DTMF tones over a loudspeaker:
- a system for picking up the played DTMF tones with the mobile communication system: and
- a system for transmitting the played DTMF tones together with the wireless communication using the mobile communication system.

10. The system according to claim 9, wherein the translating, generating, playing, picking, and transmitting systems operate as long as a wireless communication with the mobile communication system in the vehicle is detected and the measured vehicle speed exceeds the threshold.

11. The system according to claim 9, wherein the system for encoding information related to the vehicle encodes a current time and the vehicle speed measured at the current time.

12. The system according to claim 9, wherein the system for encoding information related to the vehicle encodes an identification of the vehicle.

13. The system according to claim 9, wherein the system for encoding information related to the vehicle, comprises:
- a system for determining a current position of the vehicle; and
- a system for encoding the current position.

14. The system according to claim 9, wherein the transmitting system transmits the DTMF tones corresponding to the DTMF characters over the wireless communication to a telecommunication service provider, the telecommunication server provider further including a system for filtering the DTMF tones, a system for decoding information transmitted in the DTMF tones, and a system for recording the decoded information.

15. The system according to claim 9, wherein the system for detecting a wireless communication with a mobile communication system in the vehicle further comprises:
- a system for detecting a variation of energy emitted by the mobile communication system.

16. The system according to claim 9, wherein the mobile communication system comprises a free hand system and a mobile phone, and wherein the system for detecting a wireless communication with a mobile communication system in the vehicle further comprises:
- a system for detecting a variation of energy in an output of the free hand system.

* * * * *